(12) United States Patent
Sekitsuka et al.

(10) Patent No.: US 10,672,322 B2
(45) Date of Patent: Jun. 2, 2020

(54) DISPLAY APPARATUS HAVING PROCESSORS FOR GENERATING DATA RELATING TO DISPLAY IMAGE AND RENDERING DISPLAY IMAGE, ELECTRONIC TIMEPIECE, DISPLAY PROCESSING METHOD AND COMPUTER-READABLE MEDIUM

(71) Applicant: CASIO COMPUTER CO., LTD., Tokyo (JP)

(72) Inventors: Tatsuya Sekitsuka, Kunitachi (JP); Naoto Toda, Tokorozawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/661,521

(22) Filed: Jul. 27, 2017

(65) Prior Publication Data
US 2018/0090055 A1 Mar. 29, 2018

(30) Foreign Application Priority Data
Sep. 23, 2016 (JP) .................. 2016-185052

(51) Int. Cl.
| G09G 3/20 | (2006.01) |
| G06F 3/14 | (2006.01) |
| G04B 47/06 | (2006.01) |
| G09G 5/36 | (2006.01) |
| G01S 19/42 | (2010.01) |
| G09G 3/36 | (2006.01) |
| G09G 5/393 | (2006.01) |

(52) U.S. Cl.
CPC .......... *G09G 3/2096* (2013.01); *G04B 47/06* (2013.01); *G06F 3/14* (2013.01); *G09G 5/363* (2013.01); *G01S 19/42* (2013.01); *G09G 3/3611* (2013.01); *G09G 5/393* (2013.01); *G09G 2330/021* (2013.01); *G09G 2330/023* (2013.01); *G09G 2340/04* (2013.01); *G09G 2354/00* (2013.01)

(58) Field of Classification Search
None
See application file for complete search history.

(56) References Cited

U.S. PATENT DOCUMENTS

| 9,194,955 | B1 * | 11/2015 | Fahrner | ................... G01S 19/16 |
| 9,628,601 | B2 * | 4/2017 | Lee | .......................... G06F 1/163 |
| 2002/0180724 | A1 * | 12/2002 | Oshima | ................. G06F 1/3203 345/212 |

(Continued)

FOREIGN PATENT DOCUMENTS

JP 2011-191289 A 9/2011

*Primary Examiner* — Jeffrey J Chow
(74) *Attorney, Agent, or Firm* — Scully Scott Murphy & Presser

(57) ABSTRACT

A display apparatus includes a first processor, a second processor and a display. The second processor has higher processing capability than the first processor. The display performs a display operation based on a control of the first processor. The second processor is intermittently activated to generate data relating to a display image to be rendered on the display in response to a predetermined command sent from the first processor. The first processor reads the data relating to the display image generated by the second processor and renders the display image of the data on the display.

13 Claims, 6 Drawing Sheets

(56) References Cited

U.S. PATENT DOCUMENTS

| | | | |
|---|---|---|---|
| 2007/0295904 A1* | 12/2007 | Antanouski | G01T 1/02 250/336.1 |
| 2013/0237254 A1* | 9/2013 | Papakipos | G06Q 10/10 455/456.3 |
| 2017/0041751 A1* | 2/2017 | Hong | H04W 64/006 |
| 2017/0074002 A1* | 3/2017 | Cooper | E05B 35/105 |

* cited by examiner

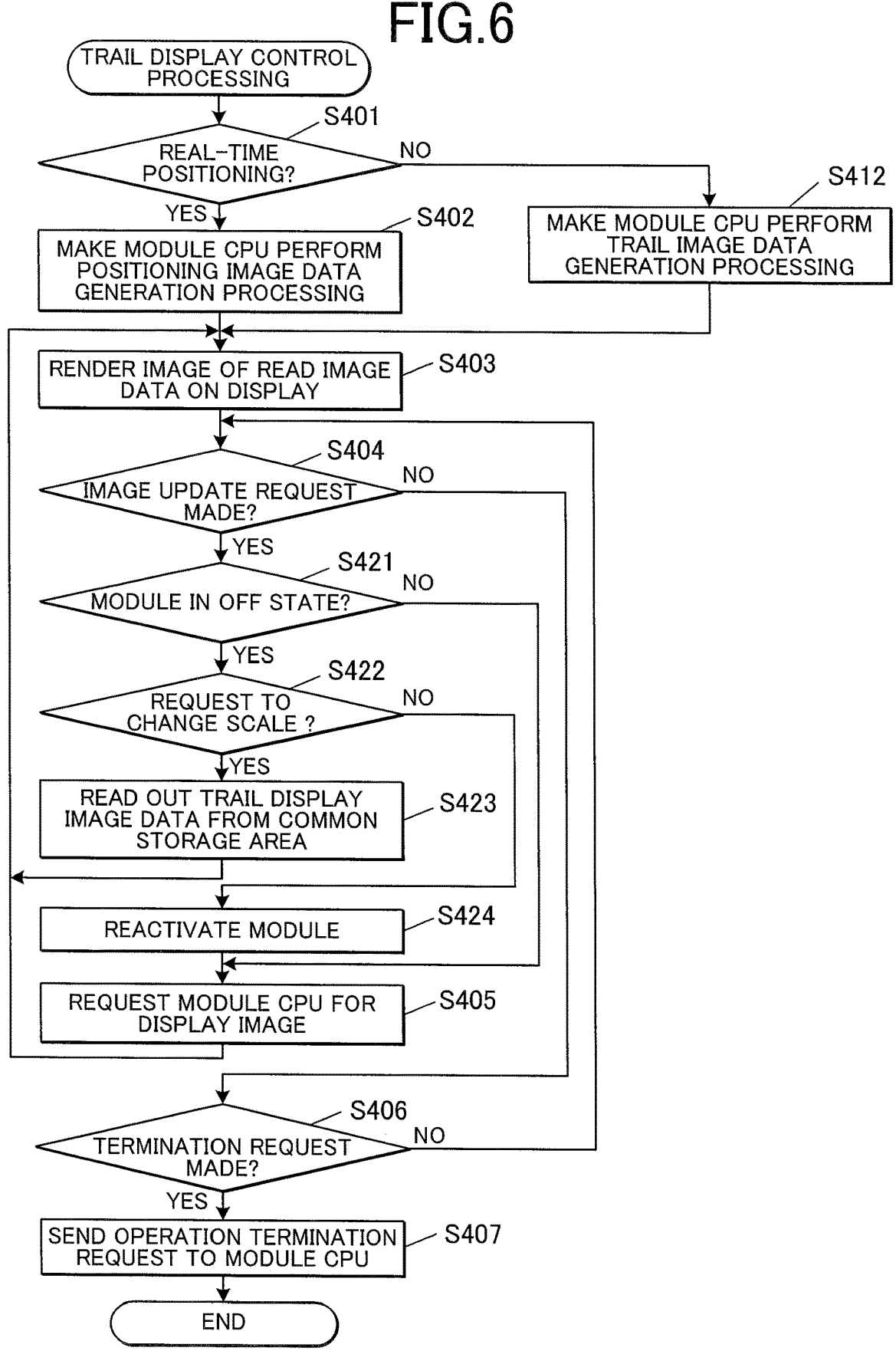

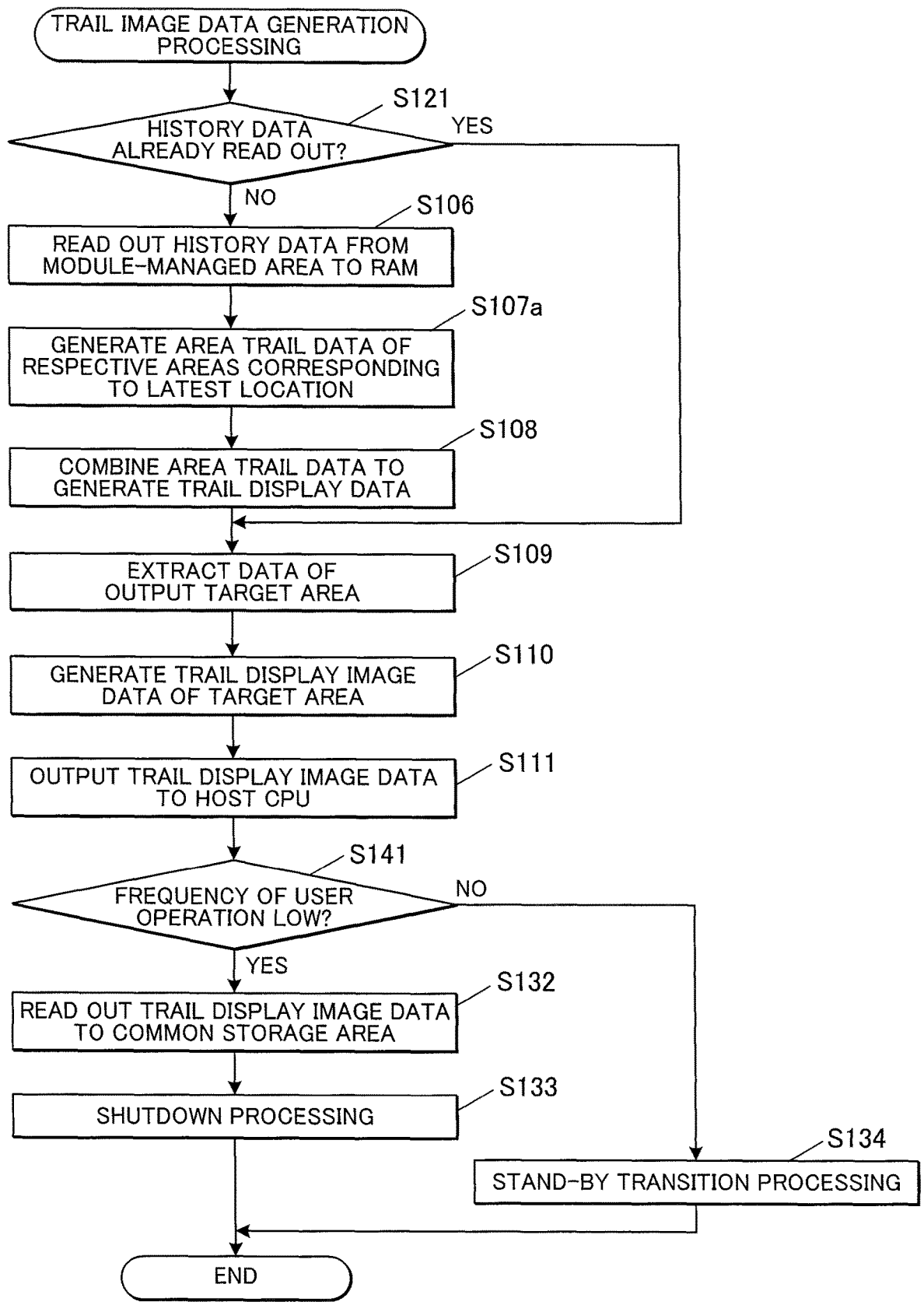

DISPLAY APPARATUS HAVING PROCESSORS FOR GENERATING DATA RELATING TO DISPLAY IMAGE AND RENDERING DISPLAY IMAGE, ELECTRONIC TIMEPIECE, DISPLAY PROCESSING METHOD AND COMPUTER-READABLE MEDIUM

CROSS REFERENCE TO RELATED APPLICATION

This application is based upon and claims the benefit of priority under 35 USC 119 of Japanese Patent Application No. 2016-185052 filed on Sep. 23, 2016, the entire disclosure of which, including the description, claims, drawings and abstract, is incorporated herein by reference in its entirety.

BACKGROUND OF THE INVENTION

1. Field of the Invention

The present invention relates to a display apparatus, an electronic timepiece, a display processing method and a computer-readable medium.

2. Description of Related Art

There have been electronic devices that can perform positioning by receiving a radio signal from a positioning satellite of the GNSS (Global Navigation Satellite System) and display the positioning result, the positioning history (movement trail) and the like. There also have been navigation apparatuses in which such location information is combined with travel route information.

Some of such electronic devices use a technique of calculating a movement trail in which satellite positioning is combined with autonomous positioning that uses a variety of sensors to measure the distance and direction of a movement (for example, see JP 2011-191289A). Since autonomous positioning requires significantly low electric power compared to satellite positioning, it is possible to obtain necessary information while reducing the power consumption by intermittently perform satellite positioning while performing autonomous positioning so as to obtain a trail from a point specified by satellite positioning to the latest point or to interpolate the trail between points specified by satellite positioning, which is particularly effective in portable electronic devices with limited battery capacity.

In atomic radio timepieces which receive a radio signal from a positioning satellite to perform positioning or to obtain the current date and time, a technique has been known in the art which provides an operation module for performing the operations of satellite positioning independently from a controller of an electronic timepiece for performing an ordinary time counting operation and the like. In such atomic radio timepieces, the controller activates the operation module to receive a radio signal from a positioning satellite and reads the reception result from the operation module to perform various processing, and the controller cuts off the power supply to the operation module after reading the reception result. The efficient processing is thus achieved, and the power consumption is reduced.

However, when the operation module is limited to perform only the processing to receive a satellite radio signal, the controller has to perform mid-load processing such as generation of image data subsequent to the reception processing. Accordingly, a problem with the prior art is that essential low-load processing may sometimes be adversely affected.

SUMMARY OF THE INVENTION

It is an object of preferred embodiments to provide a display apparatus, an electronic timepiece, a display processing method and a computer-readable medium which enable suitably distributing loads to efficiently perform necessary operations.

According to an aspect of the present invention, there is provided a display apparatus, including:

a first processor;

a second processor which has higher processing capability than the first processor; and a display which performs a display operation based on a control of the first processor;

wherein the second processor is intermittently activated to generate data relating to a display image to be rendered on the display in response to a predetermined command sent from the first processor, and wherein the first processor reads the data relating to the display image generated by the second processor and renders the display image of the data on the display.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, and wherein:

FIG. 6 is a flowchart of the control process of trail display control processing in an electronic timepiece according to a second embodiment; and FIG. 7 is a flowchart of the control process of trail image data generation processing in the electronic timepiece according to the second embodiment.

DETAILED DESCRIPTION OF THE PREFERRED EMBODIMENTS

Hereinafter, some embodiments of the display apparatus (electronic timepiece) will be described based on the drawings. However, the scope of the invention is not limited to the disclosed embodiments.

First Embodiment

An electronic timepiece according to a first embodiment will be described.

Figure 1:
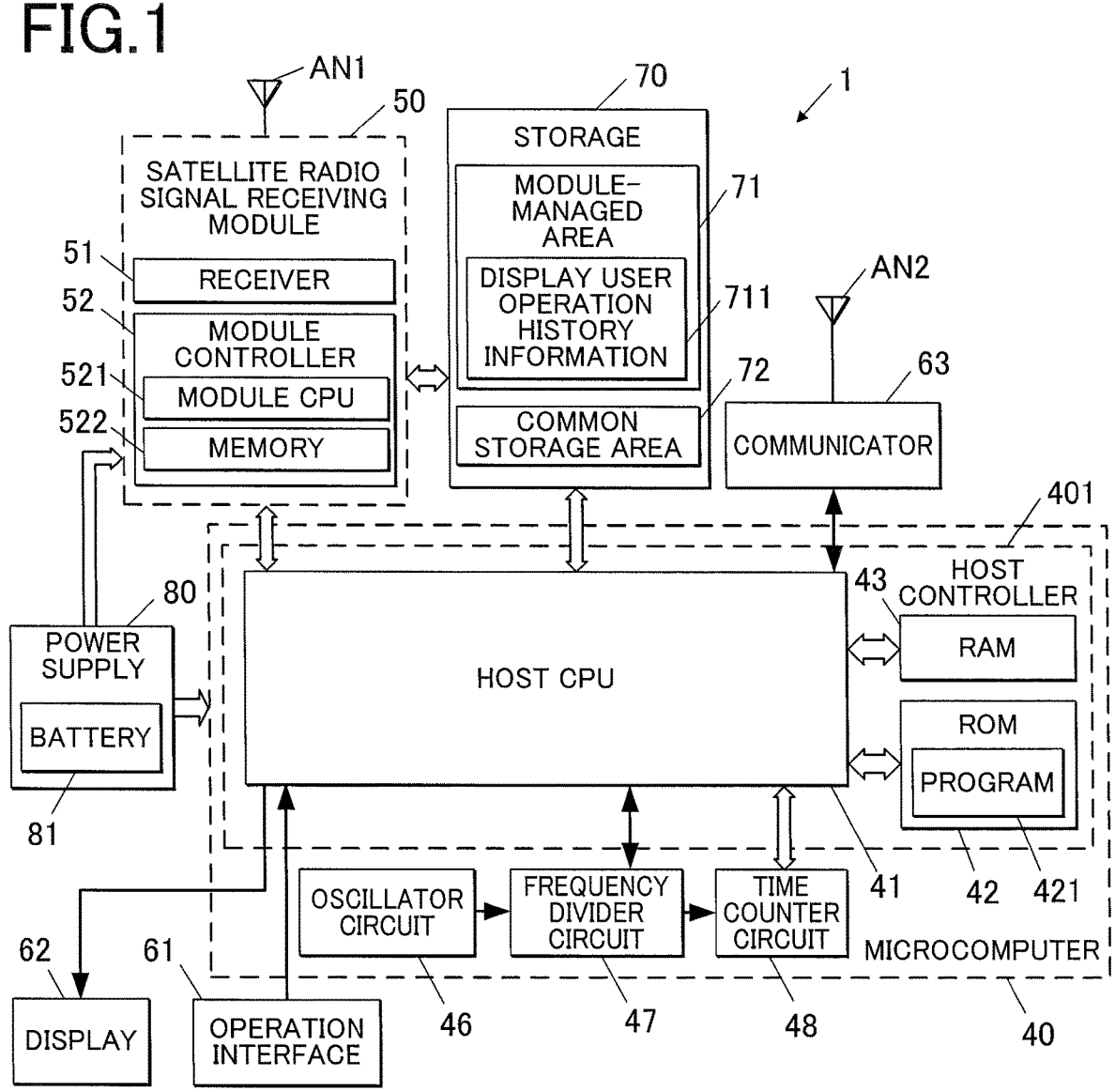
FIG. 1 is a block diagram illustrating the functional configuration of an electronic timepiece according to a first embodiment.

FIG. 1 is a block diagram illustrating the functional configuration of an electronic timepiece 1 according to the embodiment.

The electronic timepiece 1 (display apparatus) includes a microcomputer (computer) 40, a satellite radio signal receiving module 50 with an antenna AN1, an operation interface 61, a display 62, a communicator 63 with an antenna AN2, a storage 70, a power supply 80 and the like.

The microcomputer 40 includes a host controller (first controller) 401, an oscillator circuit 46, a frequency divider circuit 47, a time counter circuit (time counter) 48 and the like.

The host controller 401 includes a host CPU (Central Processing Unit) 41, a ROM (Read Only Memory) 42, a RAM (Random Access Memory) 43 and the like. The host controller 401 integrally controls the overall operation of the electronic timepiece 1.

The host CPU 41 performs various processing. The processing that is performed by the host CPU 41 is mainly related to date and time counting and display processing for a timepiece function of the electronic timepiece 1, which are low-load processing performed constantly for a long time. The host CPU 41 has lower processing capability than a module CPU 521 of the satellite radio signal receiving module 50.

The ROM 42 stores a program 421, default configuration data and the like that are used for control operations by the host CPU 41. The ROM 42 may include a rewritable non-volatile memory such as a flash memory as well as a mask ROM.

The RAM 43 provides a working memory area for the host CPU 41 and stores temporary data. The RAM 43 stores image data for displaying the current location and a movement trail, which is used to render images on the display 62.

The oscillator circuit 46 generates and outputs signals at predetermined frequency. For example, a quartz oscillator is used to generate the signals. The quartz crystal of such a quartz oscillator may be externally connected to the microcomputer 40.

The frequency divider circuit 47 outputs frequency dividing signals that divide the frequency signals input from the oscillator circuit 46 at a predetermined dividing ratio. The dividing ratio may be changed by the host CPU 41.

The time counter circuit 48 counts and retains the current date and time (at least the current time (time)) by counting the frequency dividing signals with a predetermined frequency input from the frequency divider circuit 47. The current date and time counted by the time counter circuit 48 can be corrected according to a control signal from the host CPU 41 based on the accurate current date and time obtained by the satellite radio signal receiving module 50 or the like.

The satellite radio signal receiving module 50 receives a radio signal transmitted from (external) positioning satellites of a satellite positioning system such as GPS of the United States of America through the antenna AN1 and processes the signal to obtain date and time information and current location information (location information) from the demodulated navigation message, and then outputs it to the host CPU 41. The satellite radio signal receiving module 50 includes a receiver (satellite radio signal receiver) 51, the module controller (second processor) 52 and the like, which are integrated as one piece.

The satellite radio signal receiving module 50 and the antenna AN1 constitute a location information obtaining section.

The receiver 51 detects a radio signal of a target positioning satellite and identifies the positioning satellite and the phase of the sent signal. The receiver 51 tracks the identified radio signal of the positioning satellite and continuously demodulates it to obtain signals.

The module controller 52 mainly receives the satellite radio signals, and determines the current date and time and calculates the current position (i.e. performs positioning) based on the received signals. The module controller 52 can perform other processing based on a command from the host CPU 41. The module controller 52 includes a module CPU 521, a memory 522 and the like.

The module CPU 521, which performs various processing, controls the operation of the satellite radio signal receiving module 50 and a module-managed area 71 of the storage 70. The module CPU 521 (module controller 52) has higher processing capability than the host CPU 41 (host controller 401) and is capable of performing high-load processing at high speed. Between the module CPU 521 and the host CPU 41, a connection with good power consumption efficiency such as an $I^2C$ bus is established.

The memory 522 includes a volatile memory such as a DRAM or a SRAM for providing a working memory area (including a cache memory) for the module CPU 521, a ROM for storing default configuration data etc., and the like. The ROM may be constituted by a mask ROM or a rewritable non-volatile memory.

The satellite radio signal receiving module 50 is configured to be able to individually switch power supply and clock signal supply to the receiver 51 and the module controller 52 between on and off. Regarding the module controller 52, the satellite radio signal receiving module 50 is further configured to be able to switch the status of the module CPU 521 between on and off. That is, when a satellite radio signal is not received, electric power is not supplied to the receiver 51 so that it remains deactivated. When only the memory 522 is refreshed, clock signals are not supplied to the module CPU 521 so that it remains deactivated. Further, when both clock signals and electric power are not supplied to the memory 522, the module controller 52 is shut down. In this way, the satellite radio signal receiving module 50, particularly the module controller 52, is intermittently activated as needed to perform processing that is too heavy for the host controller 401.

The operation interface 61 receives an external input such as a user operation. For example, the operation interface 61 includes at least one push button switch and outputs a corresponding signal to the host CPU 41 in response to a user operation of pressing the push button switch.

The display 62 displays various information by a control of the host CPU 41. The display 62 includes a display panel and a driver circuit for the display panel. For example, the display panel is constituted by a dot-matrix liquid crystal display (LCD) panel, and the driver circuit drives the liquid crystal display panel to display various images. The contents to be displayed on the display 62 include information on the current date and time, and a map for the current location and a movement trail of the current location.

The communicator 63 communicates with an external electronic device via the antenna AN2 by near field wireless communication by a control of the host CPU 41. An example of such near field wireless communication is BLUETOOTH (registered trademark) communication. Examples of such external electronic devices include smartphones, mobile phones, various portable electronic terminals and the like which are owned by the same user of the electronic timepiece 1. For example, through an electronic device of a communication partner, the communicator 63 can receive operational information on positioning satellites, data for setting a local time, map image data and the like and send a movement trail information of a user and the like.

The storage 70 is constituted by an auxiliary storage device, in which various configuration data, history data, programs and the like are stored and retained regardless of the power supply condition. The storage 70 is constituted by a flash memory or the like. The storage 70 includes the module-managed area (exclusive storage) 71 and a common storage area (common storage) 72. The module-managed area 71 is managed and operated by the module CPU 521 of the module controller 52 based on a predetermined OS (Operating System) so that data is read and written. The common storage area 72 is connected to the host CPU 41 and the module CPU 521 via an SPI bus or the like so that it serves as a serial flash that is accessible (readable/writable) for both. In the embodiment, the common storage area 72 is constituted by a NAND flash memory. The capacity of the storage 70 is large enough compared to the capacity of the RAM 43. The storage 70 may be integrally formed with the satellite radio signal receiving module 50.

In the module-managed area 71, data on the chronological change (movement trail information) of the current location that is repeatedly obtained multiple times by the satellite radio signal receiving module 50, i.e. information on a movement trail of a user (electronic timepiece 1). Also in the module-managed area 71, display user operation history information 711 is stored. That is, the history of user operations to change the contents of a trail display image showing a movement trail of the user is stored along with the timing of the respective user operations. Instead of the history of individual user operations, information on the frequency of user operation may be stored in the module-managed area 71 with respect to each predetermined period and each type of the user operations.

The power supply 80 supplies electric power to the components of the electronic timepiece 1, which is used for the operation thereof. The power supply 80 distributes electric power output from a battery 81 at the respective operation voltages of the components. When the operation voltages vary depending on the components, the power supply 80 converts the output voltage by means of a regulator. As the battery 81, the power supply 80 may include a solar panel for generating electric power from incident light and a secondary battery for storing the generated electric power. Alternatively, a dry-cell battery or a rechargeable battery may be detachably put in a power supply 80.

Next, a movement trail display operation in the electronic timepiece 1 of the embodiment will be described.

The electronic timepiece 1 is configured to be able to display a trail of a user based on a positioning result that is obtained by the satellite radio signal receiving module 50 using a radio signal received from a positioning satellite.

In the electronic timepiece 1 of the embodiment, the module CPU 521 generates image data relating to a display image in response to a request of the host CPU 41, and the host CPU 41 renders the image on the display 62.

When a positioning result is read from the satellite radio signal receiving module 50, the module CPU 521 sequentially adds the result in the module-managed area 71 of the storage 70 as the movement trail information. The data on the chronological change of the user location is thus retained. When the host CPU 41 requests trail display image data (data relating to a display image), the module CPU 521 reads out corresponding movement trail information from the module-managed area 71, develops it on the RAM of the memory 522 and generates the image data.

Figure 2:
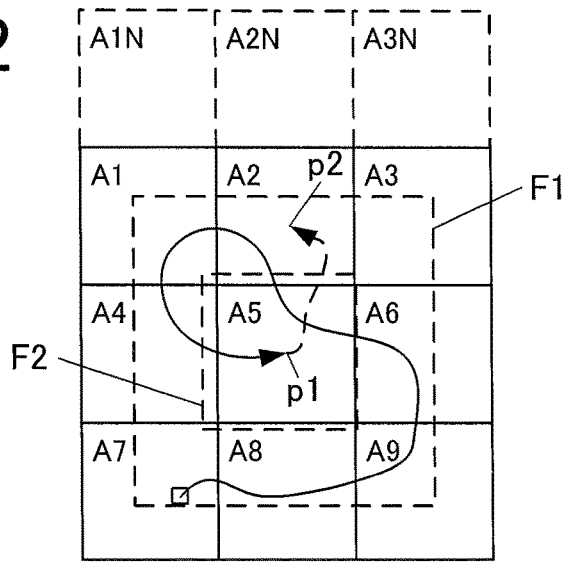
FIG. 2 illustrates trail display data.

FIG. 2 illustrates trail display data.

In the illustrated example, a trail display image F1 has a predetermined pixel size in which a movement trail is overlaid on a map image with the coordinate p1 of the current location at the center. To generate the trail display image F1, the trail display data for displaying the movement trail is generated as a plurality (nine) of area trail data of respective divided areas with a fixed size. In the illustrated example, the area trail data of the area including the current location and the adjacent 3×3 areas are synthesized and stored so that the trail display data is generated. For example, when the size of a map area in the display 62 is 384×384 pixels, area trail data is generated respectively for areas A1 to A9 each having a size of 128×128 pixels.

While the current location is continuously being obtained, the coordinate of the current location is added so that the area trail data of the area A5 including the current location is updated as the current location is moved. When the current location is moved to another area, the areas of the area trail data are changed so that the 3×3 areas of the area trail data includes the destination area at the center. For example, when the trail extends from the coordinate p1 to the coordinate p2 along the dashed line, the areas A1N to A3N that are located above the areas A1 to A3 are assigned as new areas A1 to A3, and the corresponding area trail data is generated. Further, the area trail data of the areas A1 to A6 are reassigned as the area trail data of the new areas A4 to A9.

From the trail display data thus generated and combined, the data corresponding to a trail display image F1 is extracted, and the extracted data is aligned and overlaid on map data, so that data of the trail display image F1 is obtained. As used herein, map data may include data of a preset route and data of POIs (Points Of Interest) in addition to ordinary image data of terrain, vegetation, roads, building and the like.

Along with the trail display image F1, another trail display image F2 with a different scale may be generated. The trail display images F1, F2, which have the same center location but different scales, may be simultaneously generated when a request to generate either one of them is made. Among the two images, the image to be displayed is determined based on a user operation input on the operation interface 61 or the like. Configurations (default configuration or a change of the configuration while an image is being displayed) such as the center location of the images to be generated (e.g. the area that includes the latest position and can display the movement trail for a predetermined time at the possible largest scale), the scale, the image orientation (north up, head up or the like) may be independently set based on an input (specific user operation) on the operation interface 61.

Figure 3:
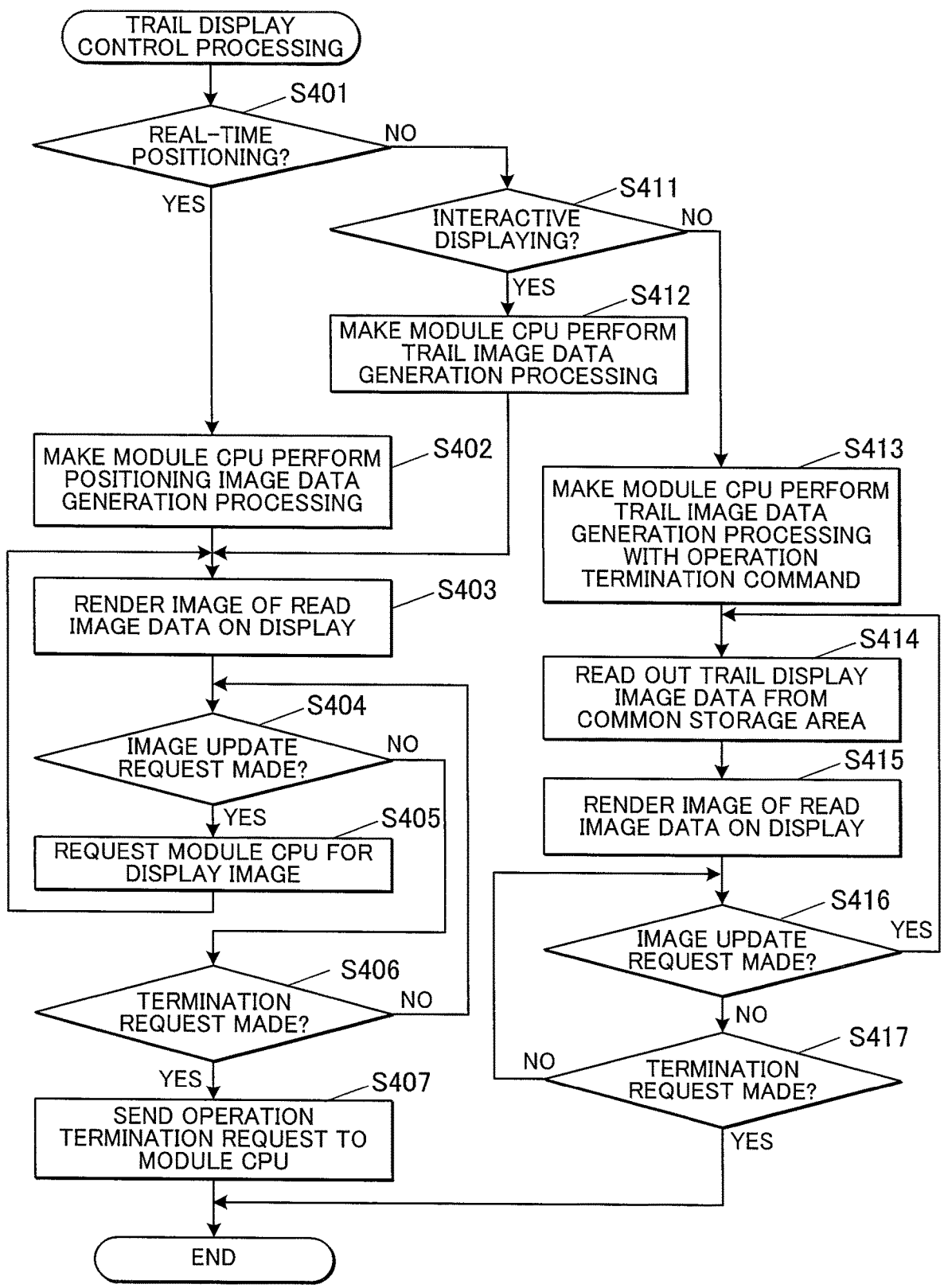
FIG. 3 is a flowchart of the control process of trail display control processing.

FIG. 3 is a flowchart of trail display control processing that is performed in the electronic timepiece 1, illustrating the control process by the host CPU 41. In the embodiment, the trail display control processing is started when the operation interface 61 detects an input of a predetermined user operation.

At the start of the trail display control processing, the host CPU 41 (host controller 401) makes a determination as to whether it was requested to display a trail while performing real-time positioning (Step S401). If it is determined that it was requested to display the trail with real-time positioning (real-time display mode) was made (Step S401, Yes), the host CPU 41 activates the module CPU 521 and makes it perform positioning image data generation processing, which is described later (Step S402). Then, the process by the host CPU 41 continues with Step S403.

If it is determined that it was requested to display the trail without real-time positioning (Step S401, No), the host CPU 41 makes a determination as to whether it was requested to display the trail in a display mode of interactively changing the display contents (Step S411). If it is determined that the interactive display mode was requested (Step S411, Yes), the host CPU 41 activates the module CPU 521 and makes it perform the trail image data generation processing, which is described later (Step S412). In this step, the command that is sent from the host CPU 41 to the module CPU 521 does not include an operation termination command. Then, the process by the host CPU 41 continues with Step S403.

In Step S403, the host CPU 41 reads image data (data of the trail display image F1) that is generated by the module CPU 521, and renders the image of the read data on the display 62 (Step S403). In this step, when not only the image data but also information on the current location in the image is obtained as the data of the trail display image, the host CPU 41 may perform an additional highlight operation such as blinking the pixel corresponding to the current location or rendering a frame or an arrow that indicates the current location.

The host CPU 41 makes a determination as to whether a request to update the image was made (Step S404). The request to update the image is made when the operation interface 61 detects an input of a predetermined user operation, or when a predetermined time has elapsed since the last update in the real-time display mode, or the like. The request may include requests to change the scale, to change the center location of the image, to show/hide a preset route or POIs and the like. If it is determined that the request was made (Step S404, Yes), the host CPU sends a command to generate new trail display image data to the module CPU 521 (Step S405). Then, the process by the host CPU 41 continues with Step S403.

If it is determined that the request was not made, the host CPU 41 makes a determination as to whether a request to terminate displaying the trail was made (Step S406). The request to terminate displaying the trail is made when the operation interface 61 detects an input of a predetermined user operation. The request may also be made when a signal indicating low battery level of the battery 81 is input from the power supply 80. If it is determined that the termination request was not made (Step S406, No), the process by the host CPU 41 returns to Step S404. If it is determined that the termination request was made (Step S406, Yes), the host CPU 41 sends an operation termination request to the module CPU 521 (Step S407). Then, the trail display control processing ends.

In the determination in Step S411, if it is determined that the interactive display mode was not requested (Step S411, No), the host CPU 41 activates the module CPU 521 and makes it perform the trail image data generation processing that includes an operation termination command (Step S413).

The host CPU 41 reads out and reads the trail display image data from the common storage area 72, which was written in the common storage area 72 by the module CPU 521 (Step S414). The host CPU 41 renders the image of the read trail display image data on the display 62 (Step S415).

The host CPU 41 makes a determination as to whether an image update request was made (Step S416). The image update in this step can be made only by replacing the data within the trail display image data that was written in the common storage area 72 in Step S414. In this embodiment, only a change of the scale is enabled. If it is determined that the update request was made (Step S416, Yes), the process by the host CPU 41 returns to Step S414.

If it is determined that the update request was not made (Step S416, No), the host CPU 41 makes a determination as to whether a request to terminate displaying the trail was made (Step S417). In addition to the case where the operation interface 61 detects an input of a predetermined user operation, this request to terminate displaying the trail also includes a termination request signal that was generated by the host CPU 41 when a predetermined time has elapsed since it started to render the image on the display 62 in Step S415. If it is determined that the termination request was not made (Step S417, No), the process by the host CPU 41 returns to step S416. If it is determined that the termination request was made (Step S417, Yes), the trail display control processing ends.

Before the trail display control processing ends, the host CPU 41 may erase the trail display image data in the common storage area 72.

Step S402 and Step S413 constitute a display data generating step or a display data generating means.

Step S403 and Step 415 constitute a display control step or a display controlling means.

Figure 4:
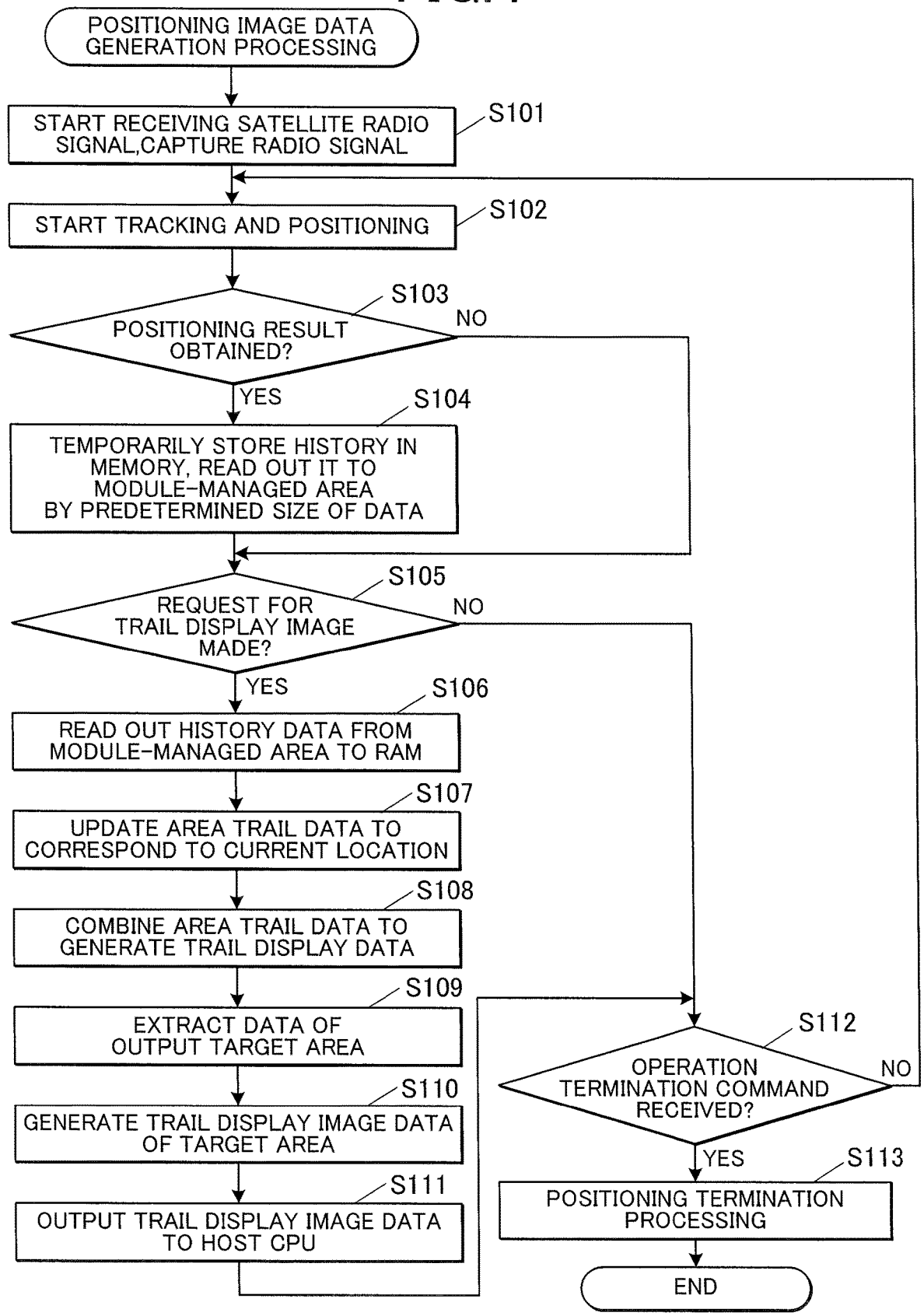
FIG. 4 is a flowchart of the control process of positioning image data generation processing.

FIG. 4 is a flowchart of the positioning image data generation processing that is performed when the host CPU requests the module CPU 521 to generate the trail display image data at predetermined time intervals while the positioning is being performed, which illustrates the control process by the module CPU 521.

At the start of the positioning image data generation processing, the module CPU 521 makes the receiver 51 start receiving a satellite radio signal to capture the radio signal from the positioning satellite (Step S101). The module CPU 521 makes the receiver 51 track the radio signal from the captured positioning satellite, and starts a positioning operation based on the received navigation message (Step S102).

The module CPU 521 makes a determination as to whether a new positioning result, i.e. the current location and the current date and time, is obtained (Step S103). If it is determined that a new positioning result is not obtained (Step S103, No), the process by the module CPU 521 continues with Step S105. If it is determined that a new positioning result is obtained (Step S103, Yes), the module CPU 521 temporarily stores the obtained positioning result in a buffer memory. Every time the total data size of the temporarily stored positioning results reaches a predetermined size, the module CPU 521 reads out and saves them in the module-managed area 71 (Step S104). Then, the process by the module CPU 521 continues with Step S105.

In Step S105, the module CPU 521 makes a determination as to whether a request (command) for trail display image data was sent from the host CPU 41 (Step S105). If it is determined that the request was not made (Step S105, No), the process by the module CPU 521 continues with Step S112. If it is determined that the request was made (Step S105, Yes), the module CPU 521 reads out history data of the positioning results from the module-managed area 71 and loads it in the RAM of the memory 522 (Step S106). The module CPU 521 updates the area trail data of the area including the current location (and the area trail data of the surrounding areas, if it is not retained) based on the loaded history data (Step S107).

The module CPU 521 combines the plurality of (nine in the embodiment) area trail data to generate single trail display data (Step S108). The module CPU 521 extracts the part of the trail display data that corresponds to the trail display image requested by the host CPU 41, i.e. the part of the trail display data that corresponds to an area specified by the current location and the setting such as the scale (Step S109), so as to generate the trail display image data of the specified area (Step S110). In this step, the module CPU 521 reads map data and the like (coordinate list data of a preset route and data (location and type) of POIs (Points Of Interest)) for the background image of the requested area. The module CPU 521 overlays the extracted part of the trail display data on the read map data such that the location coordinates are aligned, so as to generate the trail display image data. The module CPU 521 outputs the generated trail display image data to the host CPU 41 (Step S111). Then, the process by the module CPU 521 continue with Step S112.

In Step S112, the module CPU 521 makes a determination as to whether a command to terminate the positioning operation was received from the host CPU 41 (Step S112). If it is determined that the command was not received (Step S112, No), the process by the module CPU 521 returns to Step S103. If it is determined that the command was received (Step S112, Yes), the module CPU 521 performs positioning termination processing that includes termination of the receiving operation by the receiver 51 (Step S113). Then, the positioning image data generation processing ends.

Figure 5:
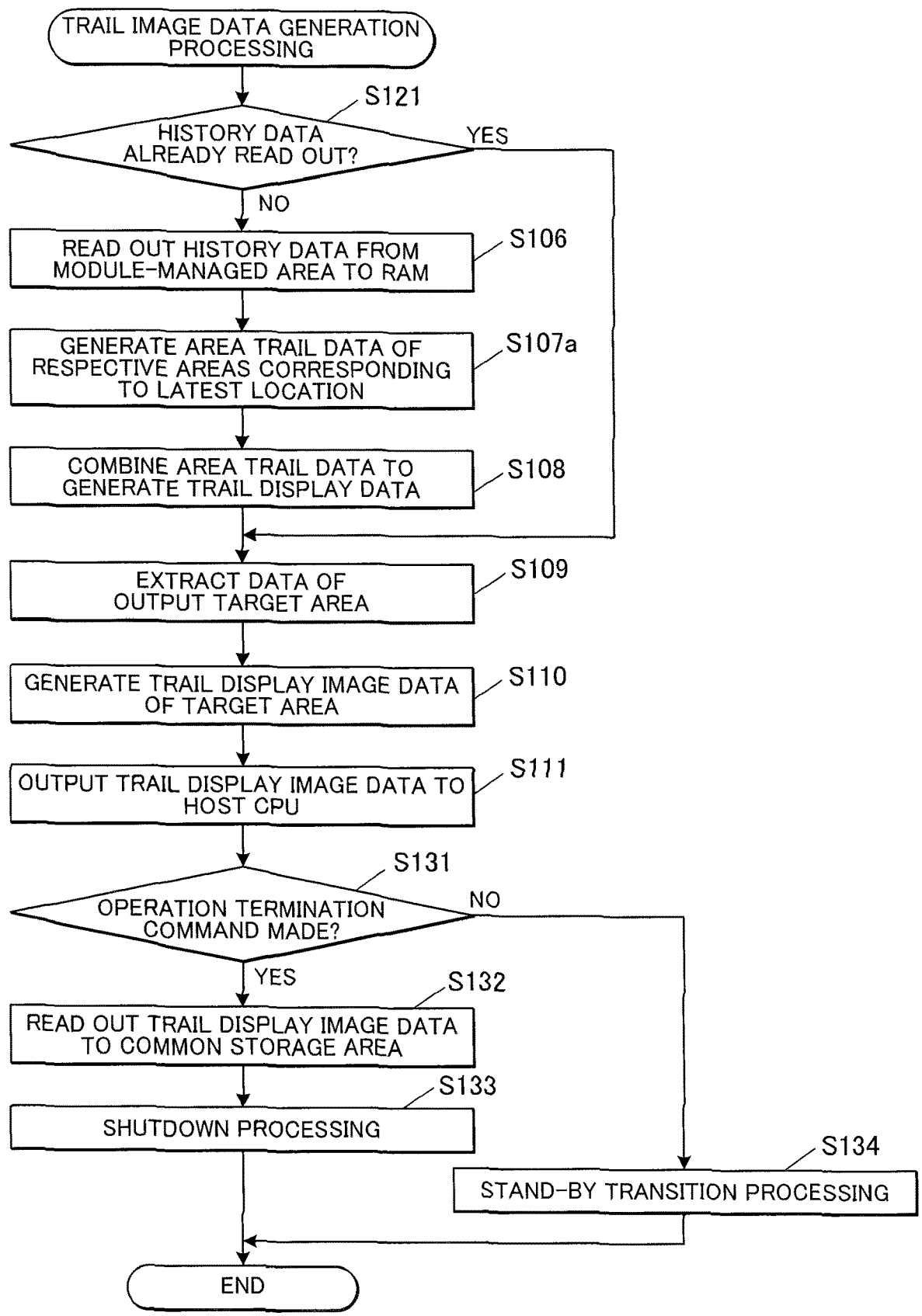
FIG. 5 is a flowchart of the control process of trail image data generation processing.

FIG. 5 is a flowchart of trail image data generation processing that is performed in the electronic timepiece 1 when the host CPU 41 requests for the trail display image while the positioning is not being performed, which illustrates the control process by the module CPU 521.

At the start of the trail image data generation processing, the satellite radio signal receiving module 50 is typically in a stand-by state (in which the memory 522 is refreshed, no clock signal is supplied to the module CPU 521, and module-managed area 71 is not in operation) or in an off state. Therefore, in this case, the host CPU 41 reactivates the module CPU 521 and sends a command to perform the processing thereto.

Compared to the above-described positioning image data generation processing, the trail image data generation processing involves Step S121 instead of Step S101 to Step S105, Step S107a instead of Step S107, and Step S131 to Step S134 instead of Step S112 and Step S113. The other steps are the same. Therefore, the same reference signs are denoted to the same steps, and the description thereof is omitted.

At the start of the trail image data generation processing, the module CPU 521 makes a determination as to whether the history data of positioning results that is used to generate a requested trail image has been already read out from the module-managed area 71 to the RAM of the memory 522 (Step S121). If it is determined that the history data has been already read out (Step S121, Yes), the process by module CPU 521 continues with Step S109.

If it is determined that the history data has not been read out yet (Step S121, No), the process by module CPU 521 continues with Step S106. After Step S106, the module CPU 521 generates the area trail data of the area including the latest location in the read history data (or the location specified as the image center) and the surrounding areas (Step S107a). Then, the process by the module CPU 521 continues with Step S108.

After Step S111, the module CPU 521 makes a determination as to whether an operation termination command to shut down the module CPU 521 was received from the host CPU 41 (Step S131). If it is determined that the command was received (Step S131, Yes), the module CPU 521 writes the generated trail display image data in the common storage area 72 (Step S132). The module CPU 521 performs shutdown processing (Step S133), and the trail image data generation processing ends. If it is determined that the operation termination command to shut down the module CPU 521 was not received (Step S131, No), the module CPU 521 performs stand-by transition processing (Step S134), and the trail image data generation processing ends.

As described above, the electronic timepiece 1 of the first embodiment includes the host controller 401, the module controller 52 having higher processing capability than the host controller 401, the display 62 that performs a display operation based on a control of the host controller 401. The module controller 52 is activated intermittently and generates data relating to a display image to be rendered on the display 62 in response to a predetermined command sent from the host controller 401. The host controller 401 reads the generated data of the image from the module controller 52 and renders the corresponding display image on the display 62.

As described above, the module controller 52 having high processing capability performs the processing of image data generation that is too heavy for the host controller 401. This enables the host controller 401 to render an image without any significant delay. Further, since the other important and continuous processing by the host controller 401 is not adversely affected, this configuration enables easily performing high-load processing without impairing ordinary functions of the electronic timepiece 1.

Therefore, the host controller 401 that performs the time counting operation control and the image rendering control is properly isolated particularly from a load related to generation of image data, and the load is distributed to the module controller 52, so that the electronic timepiece 1 can efficiently perform necessary processing on the whole.

The electronic timepiece 1 includes the common storage area 72 that is readable and writable by both the host controller 401 and the module controller 52. When the module controller 52 is shut down after generating data relating to a display image, it stores the data in the common storage area 72, and the host controller 401 reads the data relating to the display image from the common storage area 72.

While it takes a certain time to transfer data, this enables shutting down the module controller 52 without such a waiting time for data transfer to the host controller 401. Further, data of two or more images with different scales or the like may be generated and stored in the common storage area 72 in advance. This can prevent the module controller 52 from being reactivated every time the screen is switched between these display images. Further, the RAM 43 of the host controller 401 does not have to have a larger capacity than necessary. As a result, the electronic timepiece 1 can efficiently distribute the operations for displaying images without an unnecessary increase of the power consumption of the components.

The electronic timepiece 1 includes the operation interface 61 which receives a user operation, and the host controller 401 makes the module controller 52 generate data relating to a display image based on a user operation input on the operation interface 61. Accordingly, the contents and the type of the image are changeable according to a user operation. Since the module controller 52 performs the processing of generating an update image that is used to change the image, the electronic timepiece 1 can easily generate and display a user-desired image.

The electronic timepiece 1 includes the receiver 51 that obtains location information (navigation message) from the outside (positioning satellite), and the module controller 52 generates data relating to a display image from the location information obtained by the receiver 51. That is, the satellite radio signal receiving module 50 not only performs positioning but also generates data of an image for displaying the positioning result on the display 62 and outputs the generated data to the host controller 401. Therefore, the satellite radio signal receiving module 50 does not have to send unnecessary data to the host controller 401 that is not actually used for displaying the location. Further, the module controller can consistently perform the processing from the positioning to the generation of the display image that shows the positioning result.

The module controller 52 obtains movement trail information on a chronological change of the location based on the location information that is repeatedly obtained multiple times by the receiver 51. In response to a request of the host controller 401, the module controller 52 generates data of a trail display image that shows the chronological change of the location.

As described above, a number of location data is required to display a movement trail. However, it is not necessary to output such a large amount of data to the host controller 401, but the module controller 52 processes it into image data of a single image and then outputs it. Therefore, the total time of transferring data and generating an image is suitably reduced.

The electronic timepiece 1 includes the module-managed area 71 that is readable and writable by the module controller 52 but neither readable nor writable by the host controller 401, and the module controller 52 stores the movement trail information in the module-managed area 71. That is, along with the positioning operation of the module controller 52, the history of positioning data is stored in a file system area or the like that is controlled by the module controller 52. This enables efficient access to the memory, i.e an efficient writing operation and a fast reading operation. The module controller 52 reads out the data from the module-managed area 71 to generate image data and outputs it to the host controller 401 or writes it in the common storage area 72. This enables configuring only the data necessary for the host controller 401 to be readable by the host controller 401, which further improves the efficiency.

In response to a request of the host controller 401, the module controller 52 generates area trail data of divided areas as the trail display data. When the trail display image is updated, the data of an area that becomes to include a new location by the update is updated among the area trail data of the divided areas.

This eliminates the need to generate the entire image from scratch as the trail cumulatively extends, and it is necessary to update only the area corresponding to the extended part of the trail. Therefore, the processing of updating and changing the image data is reduced and shortened, and the processing load is reduced accordingly.

The receiver 51 receives a radio signal from a positioning satellite. This eliminates the need of interactive communication with the outside and enables obtaining the current location readily and more reliably all over the world. Further, this enables displaying the current location more readily by efficient processing.

In response to a request of the host controller 401 to generate the trail display image data, the module controller 52 generates a plurality of trail display image data with different scales. This enables the scale to be rapidly changed without any processing of regenerating an image as long as the location remains the same. Particularly in a non-real-time display mode, this configuration makes the image switchable even when the module CPU 521 is in an off state. Different from generation of image data for a change of the location (image center), which is flexible to a large degree, this can greatly improve the user convenience with simple processing.

The electronic timepiece 1 of the embodiment includes the components for the above-described image displaying operations and a time counter circuit 48 which counts the current date and time. The host controller 401 renders the date and time (at least the time) on the display 62 according to the current time counted by the time counter circuit 48. That is, the data of an image to be output is generated by the module controller 52 in order to avoid putting an excess load on the host controller 401 that constantly performs the operation as a timepiece. This enables constantly performing various operations without causing any negative influence on the time counting operation, various functions of alarm, timer, scheduler and the like and the display of the date and time.

In the display apparatus (electronic timepiece 1) that includes two controllers with different processing capabilities (host controller 401 and module controller 52) and the display 62 that is controlled by the controller with a lower processing capability, the usage of the above-described display processing method for the display control can improve the efficiency of the operation without putting an excess load on the host controller 401 and/or the module controller 52 or forcing them to continuously perform an unnecessary operation. This enables more suitably rendering images on the display 62.

The program 421 for the above-described display image generation processing and the display control is installed in the ROM 42 and executed by the host controller 401. This enables suitable distribution of the processing related to displaying images so as to readily avoid an excess load or an unnecessary operation (power consumption), so that the computer can perform an efficient image displaying operation.

Second Embodiment

Next, an electronic timepiece 1 of the second embodiment will be described.

The electronic timepiece 1 of the second embodiment has the same functional configuration as the electronic timepiece 1 of the first embodiment as illustrated in FIG. 1. Therefore, the same reference signs are denoted, and the description thereof is omitted.

Next, the operation to display a movement trail in the electronic timepiece 1 of the embodiment will be described.

In the electronic timepiece 1 of the embodiment, whether to perform the interactive displaying is not determined beforehand, but whether to terminate the processing of the satellite radio signal receiving module 50 is determined based on the frequency of user operation related to the image display, i.e. the frequency of image generation by the module controller 52 or the like.

FIG. 6 is a flowchart of trail display control processing in the electronic timepiece 1 of the embodiment, illustrating the control process by the host controller 401. Compared to the trail display control processing in FIG. 3 that is performed in the electronic timepiece 1 of the first embodiment, this trail display control processing additionally involves Step S421 to Step S424 between Step S404 and Step S405. Further, Step S411 and Step S413 to Step S417 are omitted. The other steps are the same. Therefore, the same reference signs are denoted to the same steps, and the description thereof is omitted.

In the determination in Step S401, if it is determined that the positioning is not performed on real time (Step S401, No), the process by the host CPU 41 continues with Step S412. Then, the host CPU 41 activates the satellite radio signal receiving module 50 (module CPU 521) as needed and makes it perform the trail image data generation processing of the electronic timepiece 1 of the embodiment (Step S412), which is described later.

In Step S404, if it is determined that the image update request was made, the host CPU 41 makes a determination as to whether the satellite radio signal receiving module 50 is in an off state, i.e. the module has been shut down (Step S421). If it is determined that the satellite radio signal receiving module 50 is not in an off state, i.e. the module CPU 521 is in operation (including the state in which the module CPU 521 is performing the real-time positioning operation) or in a stand-by state (the RAM of the memory 522 is being refreshed) (Step S421, No), the process by the module CPU 521 continues with Step S405.

If it is determined that the satellite radio signal receiving module 50 is in an off state (Step S421, Yes) the host CPU 41 makes a determination as to whether the request to update the image is a request to change the scale (Step S422). If it is determined that the request is a request to change the scale (Step S422, Yes), the host CPU 41 reads out trail display image data with a different scale that is already stored in the common storage area 72 (Step S423). Then, the process by the host CPU 41 returns to step S403.

If it is determined that the image update request is not a request to change the scale (Step S422, No), the host CPU 41 reactivates the satellite radio signal receiving module 50 (Step S424). Then, the process by the host CPU 41 continues with Step S405.

FIG. 7 is a flowchart of trail image data generation processing that is performed by the satellite radio signal receiving module 50 in the electronic timepiece 1 of the embodiment, which illustrates the control process by the module CPU 521.

The trail image data generation processing is the same as the trail image data generation processing as illustrated in FIG. 5 that is performed by the electronic timepiece 1 of the first embodiment except that Step S131 is replaced with Step S141. Therefore, the same reference signs are denoted to the same steps, and the detail description thereof is omitted.

After Step S111, the module CPU 521 references the display user operation history information 711 and makes a determination as to whether the frequency of user operation is so low that a predetermined frequency condition is not satisfied (Step S141). For example, the predetermined frequency condition, which can be suitably set, may include whether the number of user operations that have been made in a last predetermined time is equal to or greater than a predetermined number (which can be one), whether the number or the frequency of trail image data generation processing being called in the last (or the last several) trail display control processing is equal to or greater than a predetermined number, and the like. If it is determined the frequency of user operation is low (Step S141, Yes), the process by the module CPU 521 continues with Step S132. If it is determined that the frequency of user operation is not low (Step S141, No), the process by the module CPU 521 continues with Step S134.

The positioning image data generation processing that is performed by the satellite radio signal receiving module 50 of the electronic timepiece 1 of this embodiment is the same as the positioning data generation processing of the first embodiment as illustrated in FIG. 4. Therefore, the description thereof is omitted.

As described above, in the electronic timepiece 1 of the second embodiment, whether to shut down the module controller 52 after generating trail display image data is determined based on the frequency of generation of the trail display image data. This can reduce the probability of the satellite radio signal receiving module 50 standing by in an on state more than necessary. Therefore, the operations to generate and render an image can be distributed more efficiently to the host controller 401 and the module controller 52.

The present invention is not limited to the above-described embodiments, and various changes can be made.

For example, the above-described embodiments illustrate an example in which the module controller 52 of the satellite radio signal receiving module 50 serves as the controller with higher processing capability. Instead, another specific or nonspecific controller for high-load processing may be used for the processing of generating image data.

The above-described embodiments illustrate an example in which the display is constituted by a liquid crystal display. However, the display is not limited thereto. The display may have a different configuration, or a different component may double as the display. The images to be generated are not limited to still images. They may also be still image arrays (combinations) or motion pictures that are controllable by the host controller 401.

The above-described embodiments illustrate an example in which a movement trail based on positioning results is displayed. However, the display object is not limited thereto. For example, the display object may be an image that indicates the chronological change of the measurement values by the various sensors of the display apparatus (electronic timepiece 1) or numerical values or indexes based on the measurement values. Further, instead of a trail, the current location together with the information on the surrounding area of the current location that is read from the outside or various sensors may be displayed.

As used herein, an image is not limited to a figure, a video and the like but may further include a table, a text and the like. An image may be composed of only a table or a text.

The measurement of the current location (positioning) is not limited to positioning by receiving a radio signal from a positioning satellite. The measurement may be made by reading other information from the outside or by reading the data itself of the current location from the outside when the apparatus is at a predetermined location. Alternatively, autonomous navigation may be used alone or in combination, which involves measuring a movement by means of an acceleration sensor, an orientation sensor and the like and displaying the movement from a reference location as a vector.

In the above-described embodiments, the trail display image is generated by combining the area trail data, extracting a required area therefrom, and thereafter combining the extracted area with background data such as a map. Instead, the trail display image may be generated by combining the area trail data with background data such as a map, and thereafter simply combining it and extracting a required area therefrom.

In the above-described embodiments, images with different scales are generated at once. However, they may not be generated. Further, the map area to be displayed as an image may be configured to be able to be shifted by a fixed amount according to a user operation or the like, and images of areas that are shifted by one step in predetermined directions such as the four directions of north, south, east and west may be generated too. The quantity of images that can be generated at once may be suitably selected according to the processing capability of the module controller 52, the capacity of the common storage area 72, the history of user operations and the like.

The above-described embodiments illustrate an example in which the electronic timepiece 1 constitutes the display apparatus. However, other electronic devices may constitute the display apparatus as well as the electronic timepiece. The present invention is generally applicable to electronic devices such as user activity meters and sensor devices that perform low-load processing that is performed continuously for a long time compared to processing of generating a display image.

In the above-described embodiments, the host controller 401 and the module controller 52 operate by means of software to perform the processing. Instead, the processing may partly be performed by a dedicated hardware circuit or the like.

In the above description, the ROM 42 that is composed of a mask ROM, a volatile memory and the like is illustrated as an example of the computer-readable medium of the program 421 of the present invention. However, the present invention is not limited thereto. An HDD (Hard Disk Drive), a portable recording medium such as a CD-ROM or a DVD disk, or the like is applicable as the computer-readable medium. Further, the present invention also encompasses a carrier wave as a medium for distributing the data of the program of the present invention through a communication line.

A suitable change may be made in the specific details of the configurations, controls, processes and the like described in the above embodiment without departing from the spirit of the present invention.

While some embodiments of the present invention are described, the scope of the present invention is not limited to the above-described embodiments but encompasses the scope of the invention recited in the claims and the scope of the equivalents thereof.

What is claimed is:

1. A display apparatus comprising:
    a first processor configured to perform a first processing based on a current time counted by a time counter;
    a second processor having higher processing capability than the first processor, wherein the second processor is configured to control a location information obtaining section to obtain location information from an outside; and
    a common storage configured to be readable and writable by the first processor and the second processor,
    wherein the first processor is configured to send a predetermined command to the second processor to intermittently activate the second processor,
    wherein, the second processor is configured to be intermittently activated in response to the predetermined command to perform a second processing, having a higher processing load than the first processing, on the location information obtained by the location information obtaining section from the outside to generate a display image representing the location information to be rendered on a display, and to store the display image in the common storage, while the first processor continues to perform the first processing, and
    wherein the first processor is configured to:
        read the display image generated by the second processor from the common storage; and
        render the display image on the display.

2. The display apparatus according to claim 1,
    wherein the first processor is configured to send a shut down command to the second processor,
    wherein the second processor is configured to, in response to receiving the shut down command, store the display image generated by the second processor in the common storage before shutting down, and
    wherein the first processor is configured to read the display image from the common storage.

3. The display apparatus according to claim 2,
    wherein the first processor is configured to determine whether to send the shut down command to the second processor after the second processor generates the display image based on a frequency in which the second processor generates the display image.

4. The display apparatus according to claim 1, further comprising:
    an operation interface configured to:
        receive a user operation indicating a type of the display image to be rendered; and
        output an operation signal corresponding to the user operation received,
    wherein the first processor is configured to instruct the second processor to generate the display image of the type indicated by the user operation received by the operation interface based on the operation signal.

5. The display apparatus according to claim 1, further comprising:
    the location information obtaining section configured to obtain the location information from the outside.

6. The display apparatus according to claim 1,
    wherein the second processor is configured to:
        control the location information obtaining section to obtain the location information multiple times;
        perform processing of the location information which is obtained multiple times by the location information obtaining section to generate data on chronological change of location; and
        in response to the predetermined command, generate the display image based on the data on the chronological change of the location.

7. The display apparatus according to claim 6, further comprising:
    an exclusive storage configured to be readable and writable by the second processor but to be neither readable nor writable by the first processor,
    wherein the second processor is configured to store the data on the chronological change of the location in the exclusive storage.

8. The display apparatus according to claim 6,
    wherein the second processor is configured to:
        in response to the predetermined command, generate data of respective divided areas of the display image as the data relating to the display image indicating the chronological change of the location; and
        in response to new location information indicating a newly added location in the chronological change of the location being obtained, generate updated data of the respective divided areas of the display image indicating the newly added location.

9. The display apparatus according to claim 5,
wherein the location information obtaining section comprises a satellite radio signal receiver configured to receive a radio signal from a positioning satellite.

10. The display apparatus according to claim 1,
wherein the second processor is configured to be intermittently activated in response to the predetermined command to perform the second processing on the location information to generate the display image at different scales.

11. An electronic timepiece comprising:
the display apparatus according to claim 1;
the location information obtaining section;
the display; and
the time counter configured to count the current time,
wherein the first processor is configured to control the display to display a time corresponding to the current time counted by the time counter as the first processing.

12. A display processing method for operating a display apparatus that comprises: a first processor for performing a first processing based on a current time counted by a time counter; a second processor having higher processing capability than the first processor, and for controlling a location information obtaining section to obtain location information from an outside; a common storage; and a display, the display processing method comprising:
causing the first processor to send a predetermined command to the second processor to intermittently activate the second processor;
causing the second processor to be intermittently activated in response to the predetermined command to perform a second processing, having a higher processing load than the first processing, on the location information obtained by the location information obtaining section from the outside to generate a display image representing the location information to be rendered on the display, and to store the display image in the common storage, while the first processor continues to perform the first processing; and
causing the first processor to:
read the display image generated by the second processor from the common storage; and
render the display image on the display.

13. A non-transitory computer-readable storage medium storing a program for operating a display apparatus that comprises: a first processor for performing a first processing based on a current time counted by a time counter; a second processor having higher processing capability than the first processor, and for controlling a location information obtaining section to obtain location information from an outside; a common storage; and a display, the program comprising commands that make the first processor perform:
sending a predetermined command to the second processor to intermittently activate the second processor to perform a second processing, having a higher processing load than the first processing, on the location information obtained by the location information obtaining section from the outside to generate a display image representing the location information to be rendered on the display, and to store the display image generated in the common storage, while the first processor continues to perform the first processing;
reading the display image generated by the second processor from the common storage; and
rendering the display image on the display.

* * * * *